United States Patent
Fan et al.

(10) Patent No.: US 8,619,340 B2
(45) Date of Patent: Dec. 31, 2013

(54) AUGMENTING PAGE ORIENTATION DIRECTION DETECTION IN A DIGITAL DOCUMENT PROCESSING ENVIRONMENT

(75) Inventors: Zhigang Fan, Webster, NY (US); Michael R. Campanelli, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 601 days.

(21) Appl. No.: 12/915,249

(22) Filed: Oct. 29, 2010

(65) Prior Publication Data
US 2012/0105918 A1 May 3, 2012

(51) Int. Cl.
H04N 1/40 (2006.01)

(52) U.S. Cl.
USPC ........... 358/462; 358/474; 358/448; 358/488; 358/527; 358/1.18; 358/1.13; 358/452; 358/505; 358/531; 358/537; 382/182; 345/649; 715/274

(58) Field of Classification Search
None
See application file for complete search history.

(56) References Cited

U.S. PATENT DOCUMENTS

| | | | |
|---|---|---|---|
| 5,276,742 A | 1/1994 | Dasari et al. | |
| 6,151,423 A | 11/2000 | Melen | |
| 6,546,215 B2 | 4/2003 | Machida | |
| 6,574,375 B1 | 6/2003 | Cullen et al. | |
| 2009/0274392 A1 | 11/2009 | Fan et al. | |
| 2009/0316235 A1* | 12/2009 | Morimoto | 358/527 |
| 2010/0123928 A1* | 5/2010 | Morimoto et al. | 358/1.15 |
| 2012/0104093 A1* | 5/2012 | Ma et al. | 235/379 |

* cited by examiner

Primary Examiner — Miya J Cato
(74) Attorney, Agent, or Firm — Philip E. Blair; Fleit Gibbons Gutman Bongini & Bianco P.L.

(57) ABSTRACT

What is disclosed is a novel system and method for augmenting present methods used for determining the orientation direction automatically being detected of digital pages of a plurality of scanned documents in a digital document processing environment. The present method takes advantage of the observation that pages scanned in data processing centers are often highly correlated. The present method contains five primary steps. 1) Page orientation (i.e., up/down) is detected using a traditional method. 2) Each page is classified as either directional or non-directional. 3) The pages classified as directional are clustered into groups. 4) The direction for each group is determined. 5) The directional group's direction is used to revise the orientation for pages contained in the group. Through the implementation of the teachings hereof, performance, in terms of both speed and accuracy, are very high relative to current methods and detection error rates can be reduced significantly.

16 Claims, 10 Drawing Sheets

AUGMENTING PAGE ORIENTATION DIRECTION DETECTION IN A DIGITAL DOCUMENT PROCESSING ENVIRONMENT

TECHNICAL FIELD

The present invention is directed to systems and methods for detecting the orientation, i.e., up/down, of scanned documents containing various types of forms and which are being processed in a digital document processing environment.

BACKGROUND

In the document image processing arts, automatic orientation detection has drawn significant attention because the upside-down orientation detection of scanned pages is often required as a first step for further processing such as, for example, for image processing. Such analysis may be employed to improve automated page data extraction that includes text, barcodes, content, images, and the like. In order for a form to be processed using automated techniques, page orientation must be insured. When such form pages are not detected correctly, that particular form is rejected and must be manually keyed.

Many methods have arisen in this art to detect the orientation of a scanned document page. For example, one simple method of orientation detection is for an optical character recognition (OCR) system to read the page in both directions. The OCR results will likely be quite poor in one page direction and quite good in the other direction. One problem with this approach is that OCR is a costly operation in terms of computational time for many data processing centers where document throughput is high. However, OCR does provide relatively high accuracy rates.

Generally, methods for upside down page orientation detection can be classified into three broad categories. The first category utilizes the up/down asymmetry of passages of text or stroke distribution of the text. The second category applies Optical Character Recognition (OCR). When OCR is fed with a page with a wrong orientation, the error rate tends to be very high. In many cases, the OCR program module will notify a user accordingly. The correct orientation can be found by running the OCR in different orientations, and then selecting the orientation direction associated with the highest OCR confidence level. A third category, as disclosed in US. Publication No. 20090274392, to Fan et al., is based on selective character identification wherein certain simple characters such as letter "i" in lower case, and letter "T" in upper case are located and a given page's orientation determined from the orientation of those characters.

However, existing methods are not appropriate for different reasons when used in data processing center applications. The methods in the first category discussed above require a large amount of text letters to achieve statistical reliability. Also, they only work when text contains lower case characters. These two conditions are usually not satisfied in form documents. A full scale OCR usually provides enough accuracy. However, this method can be relatively expensive both in cost and in computing cycles and resources. The third method is more reliable but performance still tends to rely heavily on the number of characters located on a given page and on image quality. Unfortunately, both conditions cannot be assured. Many low image quality documents have extensive touch characters and/or many partial or broken characters thus causing incorrect orientation direction detection. In any case, the cost of an incorrectly oriented page in a high volume scan of hundreds or thousands of pages can be quite high in terms of time required for manual intervention/correction and overall customer dissatisfaction with the services being provided.

Accordingly, what is needed in this art are increasingly sophisticated systems and method for augmenting present methods used for determining the orientation direction automatically being detected of digital pages of a plurality of scanned documents in a digital document processing environment.

INCORPORATED REFERENCES

The following U.S. patents, U.S. patent applications, and Publications are incorporated herein in their entirety by reference.

"Page Orientation Detection Based On Selective Character Recognition", U.S. Patent Publication No. 20090274392, to Fan et al.

"Rapid Detection Of Page Orientation", U.S. Pat. No. 5,276, 742, to Dasari et al.

"Character Recognition With Document Orientation Determination", U.S. Pat. No. 6,151,423, to Melen.

"Image Forming Apparatus And Method Having Document Orientation Control", U.S. Pat. No. 6,546,215, to Machida.

"Method For Detecting Inverted Text Images On A Digital Scanning Device", U.S. Pat. No. 6,574,375, to Cullen et al.

BRIEF SUMMARY

What is disclosed is a novel system and method for augmenting present methods used for determining the orientation direction automatically being detected of digital pages of a plurality of scanned documents in a digital document processing environment. The present method takes advantage of the observation that pages scanned in data processing centers are often highly correlated. Through the implementation of the teachings hereof, performance of a wide array of page orientation direction detection algorithms are improved and the error rate of incorrect orientations being detected is effectively reduced.

In one example embodiment, the present method for correcting the orientation direction detected for pages of scanned documents in a digital document processing environment involves performing the following. First, a plurality of pages of a plurality of scanned documents are received. An initial orientation direction is then determined for each of the plurality of pages. The initial orientation is one of either a forward or an inverted (reverse or opposite) direction. Determining the initial orientation direction utilizes a page orientation direction detection technique which, in various embodiments hereof, can be, for example, an up/down asymmetry of text technique, an optical character recognition software/hardware module, or a selective character recognition technique. Each page is then classified as being either directional or non-directional. Once the pages have been classified, pages which have been classified as being directional are clustered into groups of pages based upon their structural similarities, in a manner as described herein further. Once grouped, a group orientation direction is estimated for each group of pages. Then, for each page of each group, the estimated group orientation direction is compared with each page's initial orientation direction to determine whether the detected initial orientation direction for this page requires correction. If correction is required then a document processing system is signaled to correct (flip) this page's detected orientation direction. Various embodiments are disclosed.

Many features and advantages of the above-described method will become readily apparent from the following detailed description and accompanying drawings.

BRIEF DESCRIPTION OF THE DRAWINGS

The foregoing and other features and advantages of the subject matter disclosed herein will be made apparent from the following detailed description taken in conjunction with the accompanying drawings, in which.

DETAILED DESCRIPTION

What is disclosed is a novel system and method for augmenting present methods used for determining the orientation direction automatically being detected of digital pages of a plurality of scanned documents in a digital document processing environment. It should be appreciated that the teachings hereof are intended to be used with existing page orientation direction detection techniques to improve the accuracy of such detection methods and to reduce the error rate of incorrect orientation detections.

One of ordinary skill in this art would be readily familiar with techniques known in this art for analyzing a digital page of a document which has been scanned into a digitized form to determine an orientation direction of a given page. Such techniques involve advanced mathematical techniques and algorithms which are well established. Those of ordinary skill in the digital document processing arts would also be familiar with various aspects taught by: "*Digital Color Imaging Handbook*", 1st Ed., CRC Press (2003), ISBN-13: 97808-4930-9007, and "*Control of Color Imaging Systems Analysis and Design*", CRC Press (2009), ISBN-13: 97808-4933-7468, both of which are incorporated herein in their entirety by reference.

NON-LIMITING DEFINITIONS

A "page" refers to a digital image of a single page of a document which has been converted into a digitized form using, for example, a document scanning device as is generally known in the arts.

A "page orientation direction detection technique" refers to any method known in the arts capable of analyzing a digital page of a document which has been converted to a digitized form using, for example, a document scanning device, and determining whether the page has an orientation direction which is either forward, inverted, or undetermined. Example techniques are taught and disclosed in many of the above-incorporated references. Example techniques comprise an up/down asymmetry of text technique, optical character recognition, and the selective character recognition technique of US. Publication 20090274392, to Fan et al. It should be appreciated that other techniques for detecting the orientation direction of a given page are intended to fall within the scope of the appended claims.

Figure 1:
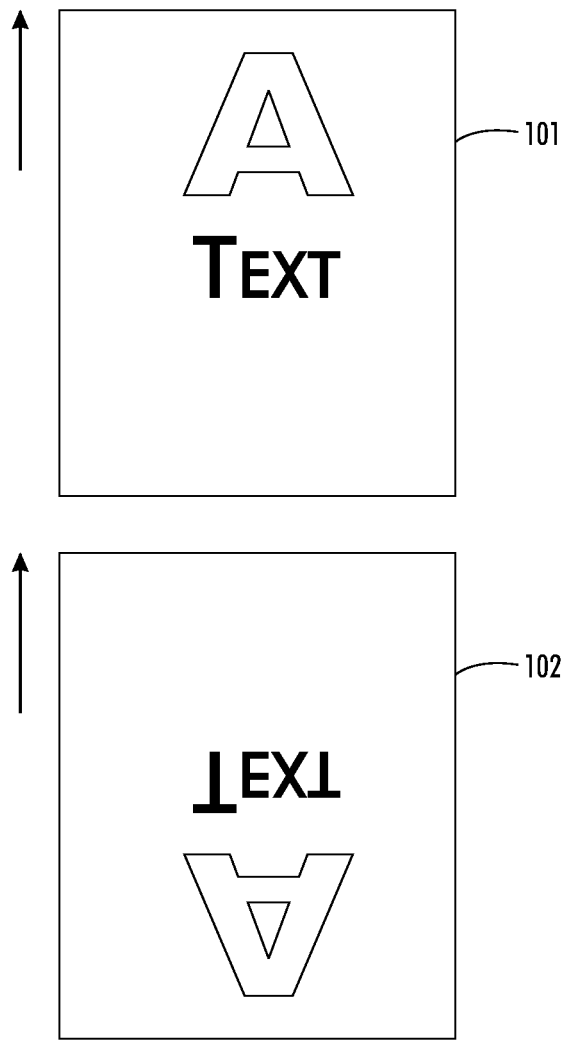
FIG. 1 shows two example digital pages to illustrate the orientation direction of 'forward' (101) and 'inverted' (102)

"Orientation" of a given page is the way in which a substantially rectangular page was oriented. For purpose hereof, a page's orientation direction is either 'forward' or 'inverted'. Examples of directions are shown in FIG. 1. For normal viewing, a page's orientation direction would be 'forward'. One example page having an orientation direction in the forward direction is shown at 101 of FIG. 1. Normal viewing can be both in a portrait and a landscape orientation, if that is how the page would normally be viewed. Normal viewing can be considered the direction text characters or fonts on the page would normally be oriented for reading or normal viewing. A page having an orientation direction in the inverted direction is shown at 102 of FIG. 1. A page with an inverted orientation direction would have, for example, textual characters which would be upside down.

"Structural Similarity" refers to a page or group of pages being substantially similar in structure. Determining structural similarity can be effectuated using any of a plurality of document analysis techniques. For example, determining structural similarities between pages can be effectuated by comparing image bitmaps between the forward and inverted versions of a page. Methods for comparing bitmaps of document images are well known in the document processing arts. In another embodiment, pages are analyzed for content objects and structural similarities between pages determined therefrom. Structural similarities can be determined by information known about the document containing that page. Such information about a given page can be retrieved from a storage device or received from a document analysis system tasked to pre-process the scanned pages in a manner such that structural similarities can be more readily assessed. It should be understood that such embodiments and alternative methods are intended to fall within the scope of the appended claims. Moreover, correlative methods may be employed to determine whether there is sufficient correlation between page structures to ascertain a measure of similarity. Correlative methods, as are known in the arts, help quantify the extent to which two sets, X and Y, go together. When high values of X are associated with high values of Y, a positive correlation exists. When high values of X are associated with low values of Y, a negative correlation exists.

Figure 2:
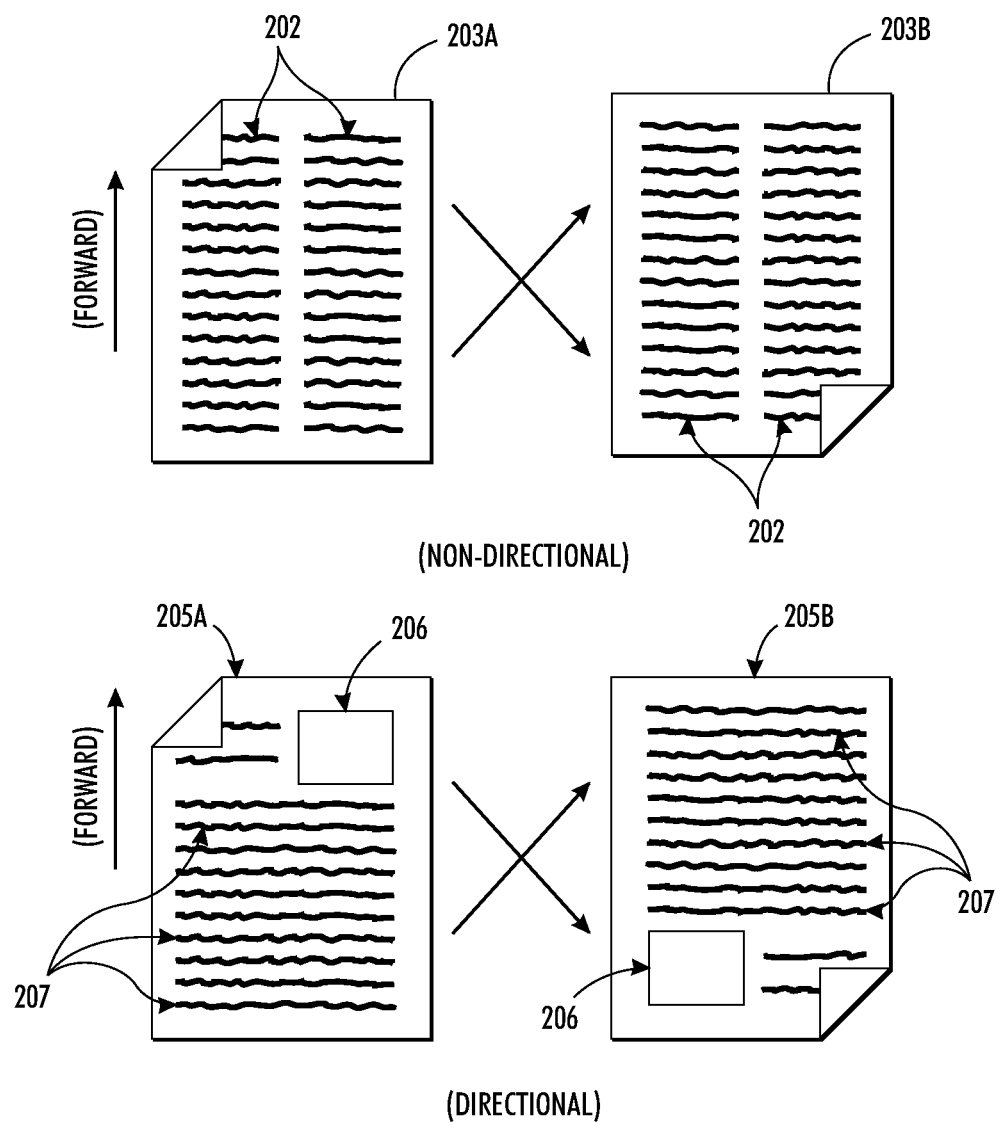
FIG. 2 illustrates a page 203A and 203B having a non-directional classification, and a page 205A and 205B having a directional classification.

A page with a "directional" classification is one which a structure which has directionality. In other words, the image of the page when viewed in one direction is substantially different from the image of the same page when viewed in the opposite direction. A "non-directional" classification is assigned to a page which has a structure which appears to be substantially the same when viewed in both the forward and inverted directions. By way of example, the forward version 203A and the inverted version 203B of the example page of FIG. 2, shown comprising two rows of text 202, are substantially similar when viewed in both the forward and inverted directions. As such, there is no directionality associated with the structure of this page. Whereas, the forward and inverted versions 205A and 205B, respectively, of an example page shown comprising a graphic 206 and a plurality of lines of text 207, are not substantially similar. There is a directionality associated with the structure of this page. As such, this page would be classified as "directional" and the page of 203(A/B) would be classified as "non-directional". To achieve this, each page needs to be examined to see if its macro structure has a strong directionality by comparing the page with its upside-down version. This can be accomplished by a correlation based method. The page is classified as directional if and only if no strong correlation exists between the page's forward version (0 degree version) and inverted versions (180 degree versions). To comparing macro structural differences, which is low-frequency in nature, the correlation is calculated at very low resolution (e.g. 0.5-2 dpi), and low-pass pre-filtering performed. The reduction of resolution is also necessary for saving computation.

Figure 5:
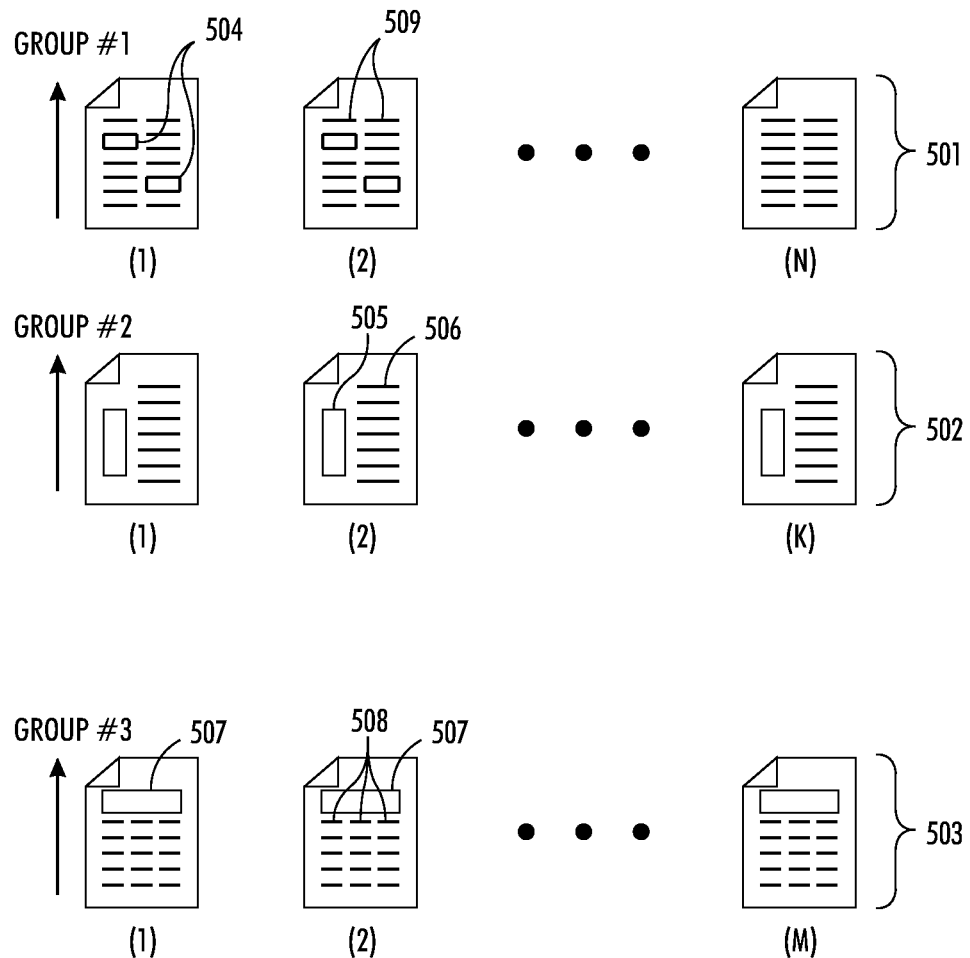
FIG. 5 shows the plurality of pages of FIG. 4 having been grouped together to form groups of pages.

A "Group of Pages" are individual pages within the scanned documents which have been grouped together based upon their structural similarities. FIG. 5 shows a plurality of pages which have been grouped together to form groups of pages, shown collectively at 501, 502, and 503.

A "Group Orientation Direction" is the orientation direction estimated for a group of pages. The orientation direction of a given page group is either forward or inverted.

A "Document Processing System" refers to any hardware or software module, or a combination there, which functions generally to process a document. Such a system, as disclosed herein, is at least capable of inverting the orientation direction of a given page. Many document processing systems are further capable of receiving a digital document over a communication pathway such as, for instance, the internet or a network, and/or scanning a hardcopy of a document into a digitized form using, for instance, integrated scanning hardware and software. A document processing system may take the form of a workstation that includes, for example, a graphical display device, a keyboard, and mouse. A document processing workstation may be used by an operator to set document processing parameters or perform document processing operations. Instructions for various operations may be input by a user via the keyboard and/or mouse, or via one or more objects displayed on a touchscreen display of a document processing workstation. A document processing system would include a processor, memory, and a storage device such as a disk drive, for storing data and machine readable program instructions. One example document processing system is shown and discussed with respect to the computer workstation of the networked document processing environment of FIG. 3 and the example block diagram of FIG. 9.

An "Document Scanning Device" is any device capable of converting a hardcopy document to a digitized image of that document. One example document scanning device is shown at 903 of FIG. 9. The set of image input devices is intended to encompass a wide variety of devices such as, for example, digital document devices, computer systems, networked platforms such as servers and client devices, and image capture devices. The set of devices includes scanners, digital cameras, and the like. Common document scanning devices typically incorporate a charge-coupled device (CCD) or a contact image sensor (CIS) as image sensing receptor(s). A signal of the scanned document image is produced. Such a signal may contain text, color values, intensity data, and pixel location, and other information about the document such as object size, object type, object location, and object orientation.

Example Document Processing Environment

Figure 3:
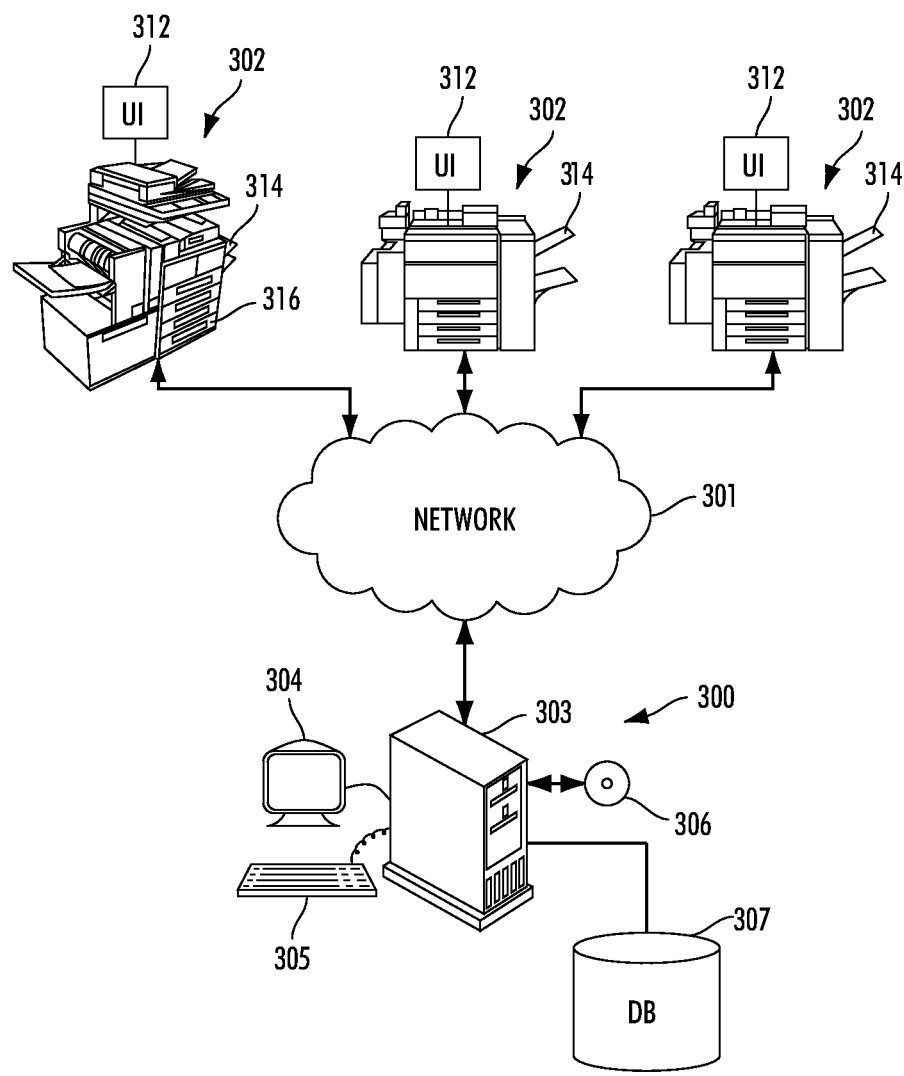
FIG. 3 illustrates one embodiment of a networked document processing environment wherein various aspects of the present method are likely to find their intended uses.

Reference is now being made to FIG. 3 which illustrates one embodiment of a networked document processing environment wherein various aspects of the present method for correcting the orientation direction detected for pages of scanned documents are likely to find their intended uses. The example networked document reproduction environment is shown generally comprising a document processing workstation 300 connected to various multifunction devices 302 over network 301. Such a networked environment may be wholly incorporated within the confines of a single print/copy center or may be distributed to many different locations throughout an enterprise network.

Workstation 300 is placed in digital communication with a plurality of multi-function document reproduction devices 302 over a network illustrated as amorphous cloud 301. Many aspects of network 301 are commonly known and may include the World Wide Web. A further discussion as to the construction and/or operation of a specific network configuration or the Internet has been omitted. Suffice it to say, data is transmitted in packets between networked devices via a plurality of communication devices and links using established protocols. Data is transferred in the form of signals which may be, for example, electronic, electromagnetic, optical, light, or other signals. These signals are provided to a communications device such as a server which transmits and receives data packets by means of a wire, cable, fiber optic, phone line, cellular link, RF, satellite, or other medium or communications pathway. Document processing workstation 300 is shown generally comprising a computer case 303 housing therein a motherboard, CPU, memory, at least one storage device, and a communications link such as a network card. The document processing workstation also includes a display device 304 such as a CRT or LCD. An alphanumeric keyboard 305 and a mouse (not shown) provide a means for entry of a user input. Computer program product 306 contains machine readable program instructions and other machine executable instructions for implementing various aspects of the functionality and features of the present method as described herein further with respect to the flow diagrams of FIGS. 6, 7, and 8.

Document processing workstation is also shown in communication with database 307 for storage and retrieval of data and historical records. The computer system 300 is capable of running a server software program (or housing server hardware) for hosting installed applications. Server software capable of hosting service applications are readily available from a variety of vendors in various streams of commerce. Computer platform 300 may further create and/or run service proxies capable of performing various aspects of the teachings hereof. One such proxy service would, for example, perform the page orientation direction detection techniques incorporated herein. The document processing workstation 300 may act as a server to processes resident on board a controller module residing within one or more of the multi-function devices 302. Workstation 300 may alternatively be a desktop, laptop, server, mainframe, or the like, common in the arts. Networked computer system 300 is capable of receiving/transmitting digital pages of document images obtained using the scanning devices associated with the networked multifunction document reproduction devices 302. One example document scanning device is shown at 315. Computer system 300 is further capable of providing one or more device-specific control instructions to any of the networked document reproduction devices 302. Special purpose program instructions loaded on workstation 300 or any of the multifunction devices 302 cause a central processor thereof to perform any of the determinations, comparisons, calculations, and the like, discussed with respect to the flow diagrams hereof, and/or provide a user or operator with selectable menu options via display 304 or user interface (UI) 312, and further provide instructions and/or recommendations which, in turn, can be communicated to any of the networked multifunction device 302. Information required for such a user selection may be retrieved and/or stored to storage device 307.

Multifunction document reproduction devices 302 are shown including a user interface (UI) 312 for the display thereon of icons and other user selectable menu options and displayed information in response to an operation of the present method. The graphical UI includes a touch screen display for receiving user input via a touch-sensitive surface, and may further include any of a keyboard, keypad, mouse, touchpad, and the like. A display on the multifunction device is one of many possible displays retained in a memory associated with a user interface, including device-specific settings for instructing a control unit to cause the multifunction device to initiate an operation in accordance with various embodiments of the present method. The user interface includes controls for programming a range of values for carrying out various embodiments hereof. The user interface further includes controls to configure any of the networked multifunction document reproduction devices 302 to perform various aspects of the present method in accordance with the teachings hereof. In the embodiment shown, the multi-function devices 302 include a document tray 314 whereon a plurality of documents are placed for input, and a plurality of trays for retaining print media. Such devices are capable of performing a print/scan/copy job function as is generally known in the digital document reproduction arts. Any of the devices of FIG. 3 are capable of receiving the pages of the scanned documents over network 301.

Techniques for placing computers in network communication with digital devices are well established. Therefore, a further discussion as techniques for placing such systems and devices in network communication has been omitted. The computer workstation 300 and the multifunction devices 302 each includes a network interface card (not shown) which facilitates the transmission of data over network 301. Any of the networked devices may include an Ethernet or similar card to connect to network 301 using, for example, a modem. Typical network interface cards found in the arts also enable one or more of the functionality of, for example, general purpose systems such as POTS (Plain Old Telephone System) and Integrated Services Digital Network (ISDN) and/or special purpose systems such as a Local Area Network (LAN) and Wireless Area Network (WAN) functionality. One or more of the multifunction devices may also be place in digital communication with one or more of the other devices in the network depending on the desired configuration and the objectives of the end-user hereof. The various print/copy/scan devices of the document reproduction environment may also include processors capable of executing program instructions incorporating one or more aspects and/or feature enhancements of the present method. One or more of the multifunction devices can be placed in communication with storage device 307 over network 301. It should be appreciated that information obtained using any of the multifunction document reproduction devices 302 may be transmitted to computer workstation 300 or to any of the other multifunction devices.

Example Plurality of Scanned Pages

Figure 4:
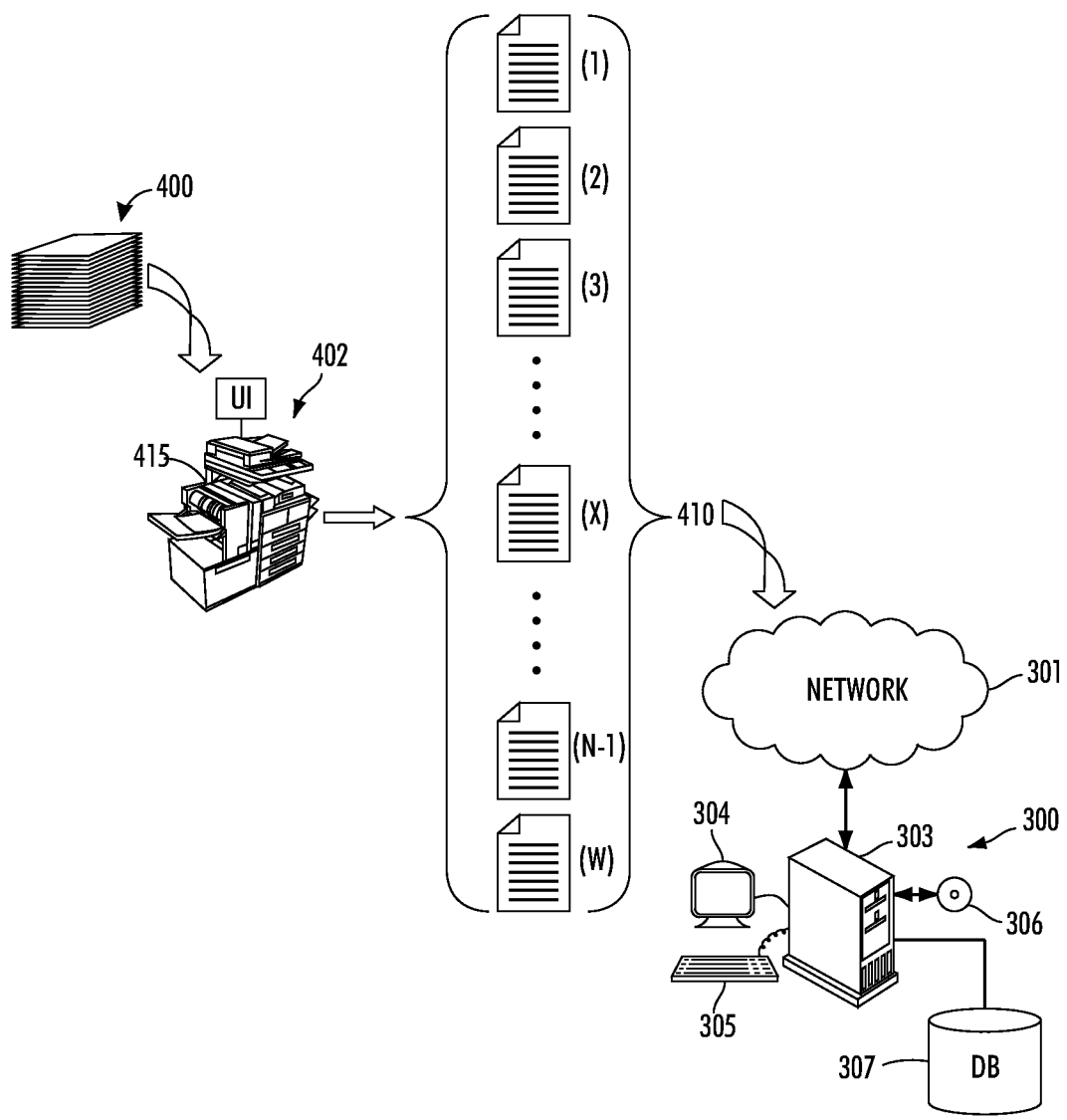
FIG. 4 illustrates an example process of providing a plurality of documents to a multifunction document reproduction device having a document scanning device to produce the plurality of digitized pages and providing these pages, over a network, to a document processing workstation wherein, in this embodiment, various aspects of the methods hereof are performed.
Figure 6:
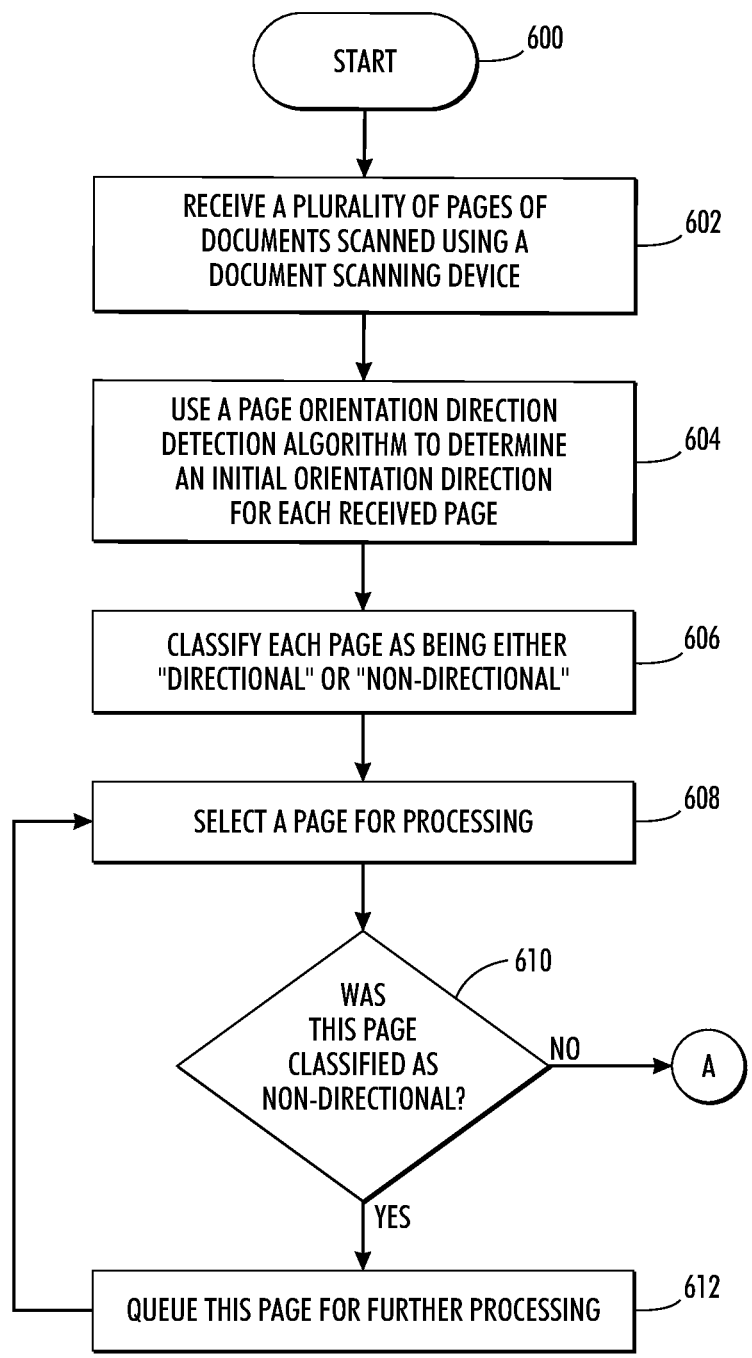
FIG. 6 is a flow diagram of one example embodiment of the present method for correcting the orientation direction detected for pages of scanned documents.
Figure 7:
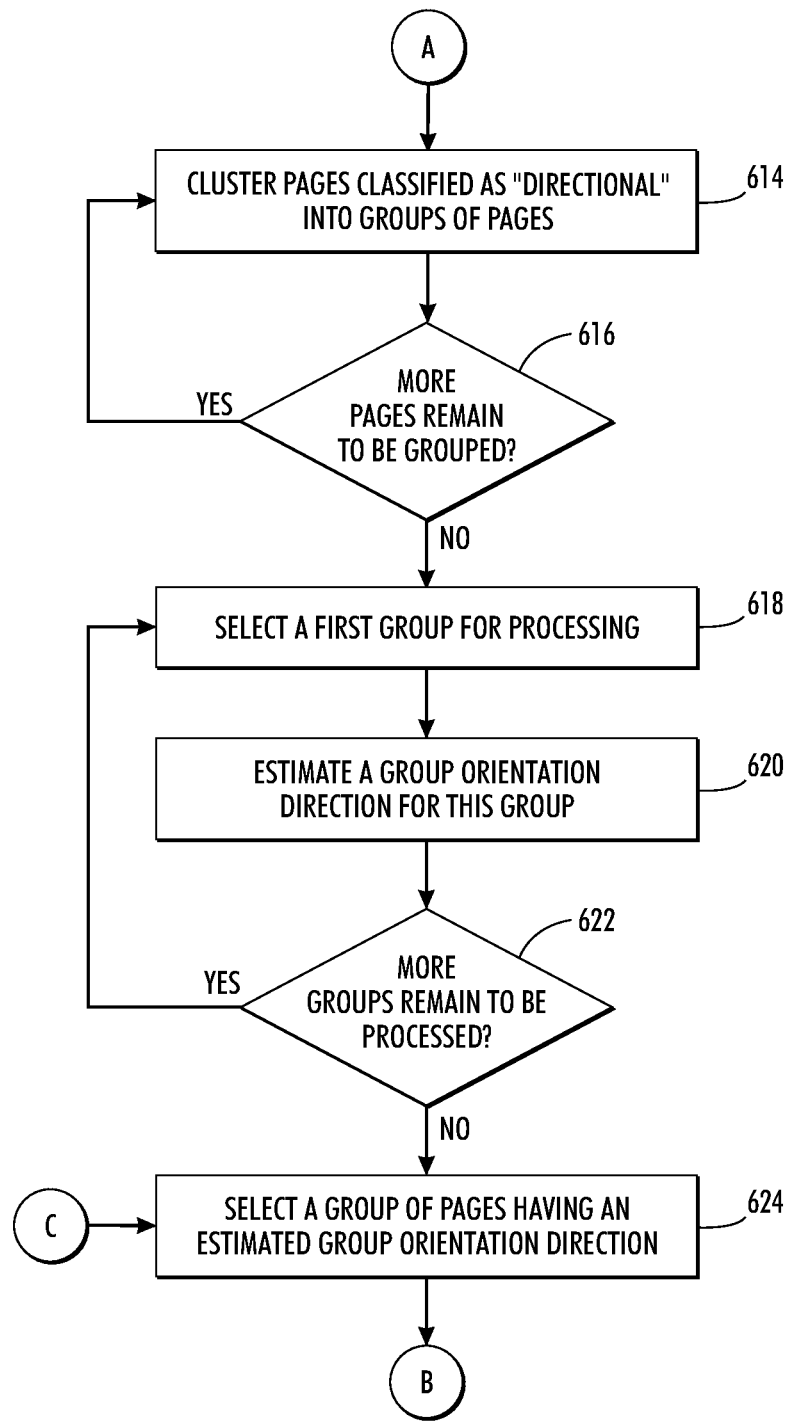
FIG. 7 is a continuation of the flow diagram of FIG. 6 with flow processing continuing with respect to node A.
Figure 8:
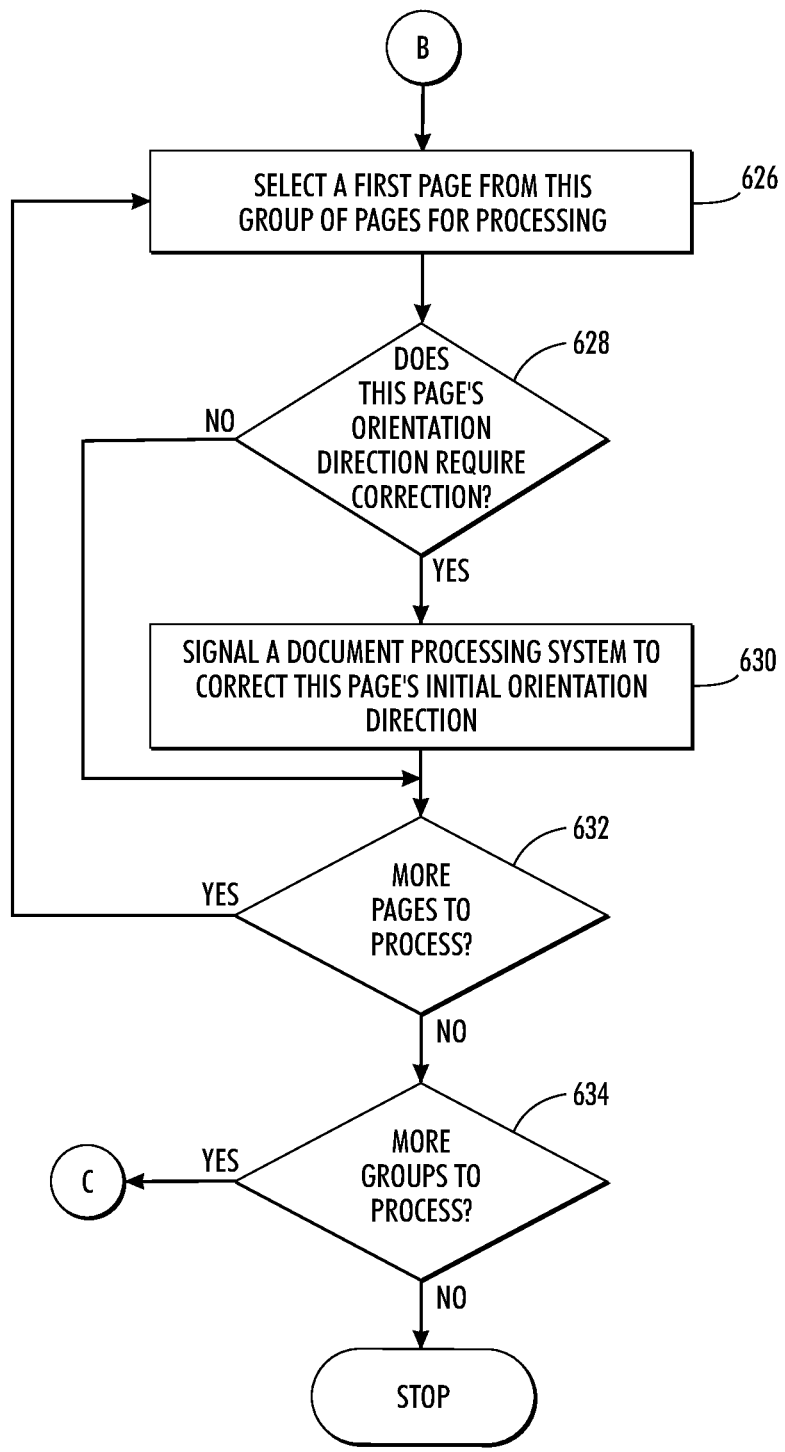
FIG. 8 is a continuation of the flow diagram of FIG. 7 with flow processing continuing with respect to node B.

Reference is now being made to FIG. 4 which illustrates an example process of providing a plurality of documents 400 to a multifunction document reproduction device 402 having a document scanning device 415 to produce the plurality of digitized pages 410 and providing these pages, over a network, to a document processing workstation wherein, in this embodiment, various aspects of the methods hereof are performed. A user or operator places a plurality of hardcopy documents 400 for which page orientations are intended to be detected and corrected using the methods hereof onto a receiving tray of multifunction document reproduction device 402. Document scanning device 415 scans the individual pages of the documents 400 and, as a result of the document scanning process, a plurality of images of individual pages, collectively at 420, are produced. The plurality of digital page images are shown having been ordered from 1 to n for illustration purposes to show the order in which the individual pages were scanned. In FIG. 4, document processing workstation 400 receives the plurality of scanned pages from multifunction device 402 over network 401 for processing in accordance with the teachings hereof. An example embodiment of the various modules and processing units which perform the steps of the present method, as shown and discussed with respect to the flow diagrams of FIGS. 6-8, is discussed herein further with respect to the block diagram of FIG. 9.

Example Pages Grouped by Structural Similarity

Reference is next being made to FIG. 5 which shows a plurality of pages of documents which have been grouped based upon structural similarities between pages. Shown are three groups of pages shown collectively in groups 501, 502 and 503. These pages may be, for example, pages of standardized answer sheets for three different tests. The pages are preferably examined in both the forward and reverse direction to determine structural similarities. As discussed previously, two pages are structurally similar if their structures are determined to be substantially similar to each other (i.e., above a threshold of similarity) when compared to each other in either the forward or inverted directions. Two pages may be substantially different when compared to each other in a same direction such as, for example, a forward direction, but are determined to be substantially similar when compared to each other when one page is oriented in one direction and the other page is oriented in an opposite direction.

In Group #1, there are a total of N pages each having structural similarity of two columns of text (at 509) and two graphics (at 504). Columns of text are readily detectable in documents using methods which are well established in the document processing arts. Group #2 has a total of K pages. Each of the K pages has the structural similarity of a graphic 505 positioned on the left hand side of the page and a single column 506 of text running along right hand side of the page. Group #3 comprises a total of M pages with each page having a graphic object 507 positioned at the top center of the page and three individual columns 508 of text immediately below. It should be appreciated that the structural similarities of the groups of pages of FIG. 5 is illustrative and that other structural similarities and variations thereof are intended to fall within the scope of the appended claims. It should also be appreciated that, for illustrative and explanatory purpose, each of the pages of each of the groups of FIG. 5 are shown as being all oriented in the forward direction. The pages could also be oriented in the inverted direction.

Flow Diagram of One Example Embodiment

Reference is now being made to the flow diagrams of FIGS. 6, 7, and 8, which collectively illustrate one example embodiment of the present method for correcting the orientation direction detected for pages of scanned documents. Flow processing begins at 600 and immediately proceeds to step 602.

At step 602, a plurality of pages of one or more documents which have been scanned into a digitized form are received. Example plurality of pages are shown at 400 of FIG. 4, and at 904 of FIG. 9. Pages of documents can be received from a document scanning device such as document scanner 903 or over a network from a remote device such as computer system 300 or retrieved from a storage device. The scanned plurality of pages are provided to a document processing system having a page orientation direction detection algorithm executable thereon for processing in accordance with the following steps. An embodiment of an example networked configuration containing a document processing workstation is shown and discussed with respect to the example document processing environment of FIG. 3 and the example block diagram of FIG. 9.

At step 604, an initial orientation direction is determined for each of the plurality of pages. The initial orientation direction is determined using a page orientation direction detection technique. The initial orientation direction detected can be either forward or inverted. The teachings hereof are directed towards correcting initial orientation directions detected using such an algorithm and are intended to augment the page orientation direction detection algorithm employed. Various page orientation direction detection algorithms are well established in the document processing arts. Known methods include the up/down asymmetry of text technique, optical character recognition, and the selective character recognition method. A further discussion thereof can be found in the above-incorporated references. Confidence levels can be assigned to a page's respective detected initial orientation direction by the page orientation direction detection algorithm. Such confidence levels can be utilized to determine whether a page's orientation direction requires correction.

At step 606, each of the pages is classified as being either directional or non-directional. Example pages classified as directional and non-directional are shown in FIG. 2.

At step 608, a page is selected for processing with respect to the next determination step. In an alternative embodiment, only a subset of all the received pages are processed. A user may select one or more pages for further processing. In this embodiment, all the received pages are processed accordingly.

At step 610, a determination is made whether the selected page is non-directional. If so, at step 612, the page, in this embodiment, is queued for further processing and the flowchart continues with respect to step 608 wherein a next received page is selected. Processing repeats in such a manner until all received pages have been processed accordingly. In various embodiments, queuing a page for further processing involves keeping the initial detection result as the orientation direction for this page, or re-examining the page by the same or another page orientation direction detection algorithm, or alternatively requiring a user intervention to manually inspect this page. If an orientation direction can be determined for this page either manually or otherwise, then this page can be directed through the present method again and processed in a manner as are the other pages. A signal or an alert may be provided to a user or operator of the document processing workstation wherein the teachings hereof are implemented, for a manual or visual determination. Alternatively, non-directional pages are stored or buffered for queuing. One example buffer is shown at 906 of the block diagram of FIG. 9. Page buffers can take the form of a memory or a software data structure such as, for example, a record, an array, or a linked list. Precisely how pages classified as 'non-directional' are processed will depend to a relatively large extent on the configuration of the document processing environment wherein the present method is implemented and further may also depend on the goals and objectives of the operator thereof. How pages with undetermined orientation directions are processed is beyond the scope of the present invention as disclosed herein and as claimed. If, at step 610, the selected page has been classified as directional, i.e., having an initial orientation direction as being either 'forward' or 'inverted', processing continues with respect to node A of FIG. 7.

Reference is now being made to the flow diagram of FIG. 7 which is a continuation of the flow diagram of FIG. 6 with flow processing continuing with respect to node A.

At step 614, pages classified as 'directional' are clustered into groups of pages. Example pages which have been clustered into groups based upon their structural similarities as viewed in both the forward and inverted directions, are shown in FIG. 5 The example pseudocode may be used to facilitate this 'clustering' step.

1. Initiate N to 0 // where N is the number of groups of pages;
2. For each "directional" page i do steps 3-19;
3. Prepare a 0-degree version p0(i) and a 180-degree version p180(i) of page i.
4. r0 = 0; r1 = 0;
5. For each cluster j, do steps 6-13
6. Calculate r0 = correlation coefficient between p0(i) and t(j) // where t(j) is the template for group j;
7. Calculate r1 = correlation coefficient between p180(i) and t(j) // the correlation is calculated in low -resolution in a similar fashion as in determining "directional";
8. if (r0 > t0 and r1 < t1) do steps 9 and10. // page i is similar to template j and they have same orientation; and t0 and t1 are preset thresholds with t0 ≥ t1 ≥ 0;
9. d(i) = 0; // direction estimated from inter-page correlation is 0 degree;
10. g(i) = j; // page i belong to group j;
11. if (r1 > t0 and r0 < t1) do 12 and 13. // page i is similar to template j and they have different orientations;
12. d(i) = 180; // direction estimated from inter-page correlation is 180 degree;
13. g(i) = j; // page i belong to group j;
14. if (r0 > t0 and r1 > t0) exit // error, t0 is set too low;
15. g(i) = N; // page i do not belong to any exiting groups; start a new group;
16. d(i) = 0;
17. if D(i) == 0 then t(N) = p0(i), where D(i) is the direction estimated for page i obtained in the initial detection;
18. else t(N) = p180(i); // template is in upright position;
19. N = N+1;
20. End.

Alternatively, a user or operator of a document processing workstation may be queried to enter structural information about one or more pages and that information relied upon, in whole or in part, to cluster pages into groups of pages. Methods abound in this art for analyzing content and structures of scanned documents. Such methods can readily identify content or content of interest, extract content, and compare content across a plurality of pages. As such, a discussion as to one particular method for determining structural similarity of pages within a group of pages has been omitted.

At step 616, a determination is made whether any more pages remain to be processed into groups of pages. If not, then processing repeats with respect to step 614 wherein a next page is processed for clustering. The steps repeat until all pages classified as 'directional' have been clustered into groups of pages.

At step 618, a first group of pages is selected for processing according to the embodiment of the next steps. Groups may be selected automatically or interactively. Some or all of the groups may be selected for processing. In this embodiment, all the groups will be processed.

At step 620, a group orientation direction is estimated for the group of pages selected in step 618. To achieve this, each group is evaluated for its detection consistency to see if the initial detection results for the pages in the group agree with each other. For each group j, two counters are established and both are initialize to 0. One counter is for the votes for the direction specified by t(j), and the other counter is for the votes in the opposite direction. The pages that are low in confidence (c(i) below a pre-set threshold $t_c$, where C(i) is the detection confidence for page I obtained in initial detection do not participate in the voting. For each page with high confidence, e(i)=d(i)−D(i) is calculated. If e(i) is zero, which happens either both d(i) and D(i) are zero, or both are 180 degrees, the first counter is increased by one, otherwise the second counter is updated. If the voting is unanimous, a group direction G(j) is determined. If all the votes go for the first case, the group direction G(j)=0, which means it is same as t(j), otherwise G(j)=180, which means it is opposite to t(j). If the voting is divided then it is likely that the groups contain more than one type of forms and they have different orientations. In this case, no direction can be estimated for this group.

At step 622, a determination is made whether any more groups of pages remain to be processed. If so then processing repeats with respect to step 618 wherein a next group is selected or otherwise identified and a group orientation direction is estimated for this next selected group. Processing repeats in such a manner until a group orientation direction has been estimated for all groups of pages. In alternative embodiments, a group orientation direction is estimated for only a subset of all the groups of pages. A user or operator may provide an input as to which groups are desired to be processed herein and which groups are not. Once a group orientation direction has been estimated for all the groups selected in step 618, processing continues with respect to step 624.

At step 624, a first group of pages for which a group orientation direction has been estimated is selected for processing in accordance with the following steps as discussed with respect to FIG. 8.

Reference is now being made to the flow diagram of FIG. 8 which is a continuation of the flow diagram of FIG. 7 with flow processing continuing with respect to node B.

At step 626, a first page is selected for processing from this group. Each page which has been selected or otherwise identified is processed according to the following steps.

At step 628, a determination is made whether this page's orientation direction requires correction. Determining whether a page's orientation direction requires correction is based upon a comparison of this pages initial orientation direction with the estimated group orientation direction for the group in which this page has been previously clustered (step 614). To achieve this, the orientation of each page is revisited in the groups that are voted unanimously. For a page i (in group j) that is low in confidence (c(i) lower than $t_c$), its direction is determined as [d(i)+G(j)]% 360. In other words, the revised direction would be 0 if the group direction is 0 and page i and the template have the same direction, or the group direction is 180 and page i has a different orientation. On the contrary, the revised direction would be 180 if the group direction is 180 and page i and the template have the same direction, or the group direction is 0 and page i has a different orientation. The exact method of correcting the page's orientation direction will necessarily rely on various aspects specific to the implementation of the methods hereof and the document processing environment wherein these teachings find their intended uses. If a page's orientation direction requires correction then, at step 630, a document processing system capable of correcting a page's orientation direction is signaled to change (flip) this page's detected initial orientation direction. Statistics about a number of pages which required change can be collected and associated with each page orientation direction detection technique employed.

At step 632, a determination is made whether any more pages in this group remain to be processed. If so then processing repeats with respect to step 626 wherein a next page within this group is selected or otherwise identified for processing and the process repeats until all pages within the group identified in step 624 have been processed. Thereafter, at step 634, a determination is made whether any more groups of pages remain to be processed. If so then processing repeats with respect to node C wherein, at step 624, a next group is identified, retrieved, or otherwise selected for processing from among the remaining groups of pages. All the pages of this next group are processed according. Processing repeats in such a manner until all the pages of all groups have been processed. Thereafter, further processing stops.

It should be appreciated that the flow diagrams hereof are illustrative. One or more of the operative steps illustrated in any of the flow diagrams may be performed in a differing order. Other operations, for example, may be added, modified, enhanced, condensed, integrated, or consolidated with the steps thereof. Such variations are intended to fall within the scope of the appended claims. All or portions of the flow diagrams may be implemented partially or fully in hardware in conjunction with machine executable instructions.

Figure 9:
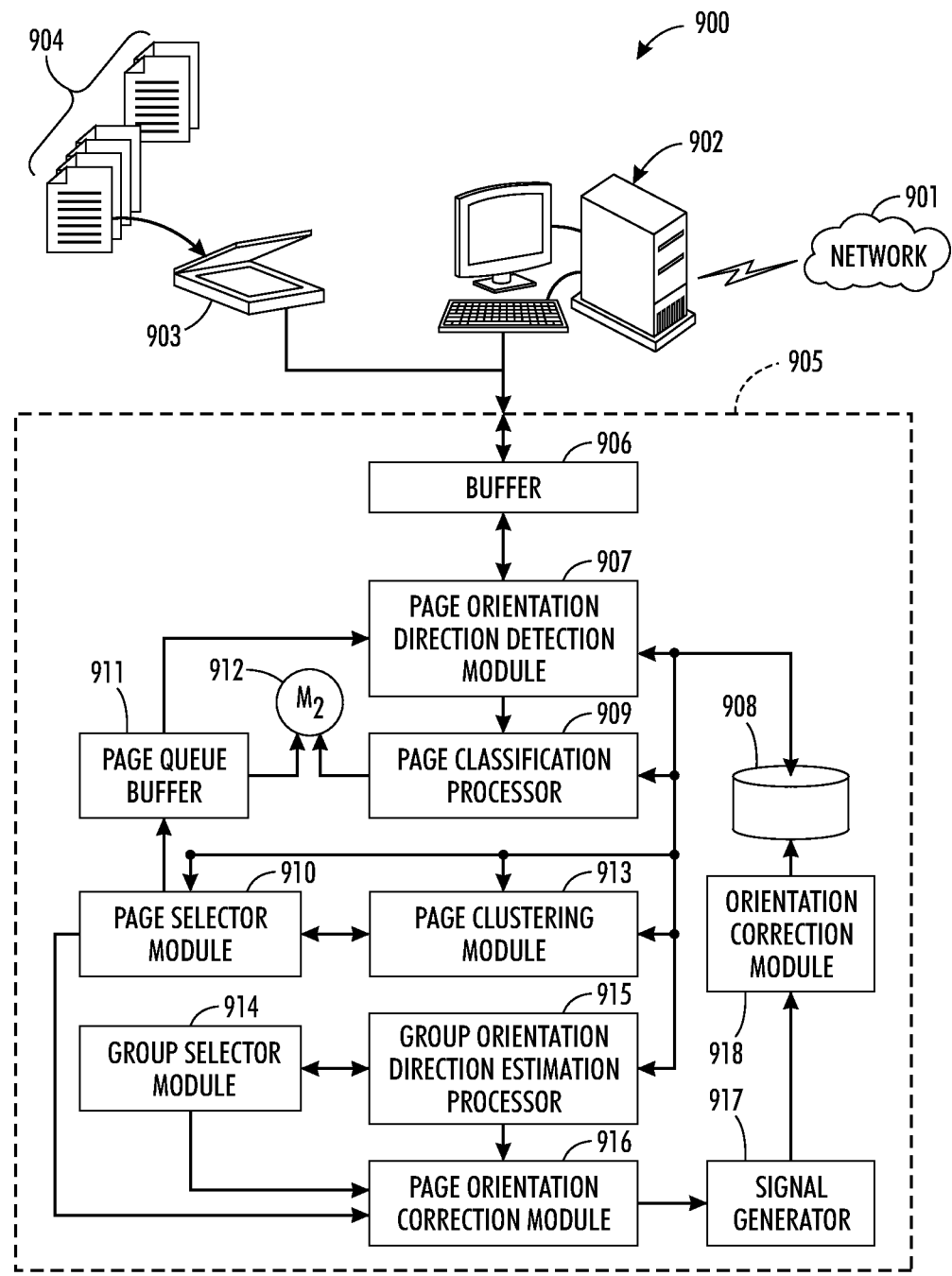
FIG. 9 illustrates a block diagram of one example document processing system capable of implementing various aspects of the present method shown and described with respect to the flow diagrams of FIGS. 6-8.

The methods described can be implemented on a special purpose computer such as that discussed herein further with reference to FIG. 9. In general, any device capable of implementing a finite state machine, that is in turn capable of implementing one or more elements of the flow diagrams provided herewith can be used. The methods hereof can be implemented as a routine embedded on a personal computer or as a resource residing on a server or workstation, such as a routine embedded in a plug-in, a photocopier, a driver, a scanner, a photographic system, a xerographic device, or the like.

Example Document Processing System

Reference is now being made to FIG. 9 which illustrates a block diagram of one example document processing system 900 capable of implementing various aspects of the present method shown and described with respect to the flow diagrams of FIGS. 6-8.

The embodiment of FIG. 9 is shown comprising a workstation 902 having many of the same elements as described with respect to the computer workstation 300 of FIG. 3. The workstation is shown in communication with document scanning device 903. Computer system 902 is shown also in communication with network 901 via a network communications interface (not shown). Plurality of pages 904 of various documents are individually placed on the platen of document scanning device 903 and scanned into a digitized form. The received pages are communicated to document processor 905 for processing in a manner described above with respect to the flow diagrams of FIGS. 6-8. All or portions of the scanned pages may be stored to a memory or storage device internal to workstation 902 and may be communicated to a remote device over network 901 for storage or further processing. A user may use the graphical user interface, e.g., keyboard and monitor, of workstation 902 to identify or otherwise select pages and/or groups of pages for processing or may identify structural similarities between pages or provide other user input required for the implementation hereof. Alternatively, objects and/or regions of objects of interest or information about the received pages such as, for instance, object location, a number and type of regions of various objects of interest identified or otherwise detected in the received pages may be retrieved from a remote device, such as a document processing system or content object detection system, over network 501. Desktop computer 902 and the image input device 903 are in communication with document processor 905.

Document processor 905 is shown comprising a buffer 906 for queuing information relating to pages 904 such as, for instance, content objects, object/region location, object/regions of interest, text, and the like. Buffer 906 may further store retrieved data and mathematical formulas and representations to process the pages and groups of pages in the above-described manner.

Page Orientation Direction Detection Module 907 determines an initial orientation direction for each of the plurality of pages 904 using a page orientation direction detection technique. As discussed, the detected initial orientation direction for a given page can be either forward or inverted. Module 907 stores the detected initial orientation direction for each page in storage device 908 along with any other parameters used which may be required for further processing such as, for example, a confidence level associated with the page's detected orientation direction. Storage device 908 may be any device or system capable of storing pages of digitized documents and associated parameters and values. One embodiment of a storage device is a database, as are well known in the arts. Storage devices include RAM, ROM, Cache Memory, CD-ROM, DVD, flash drives, hard drives, and other volatile or non-volatile storage media.

Page Classification Processor 909 receives pages from either Module 907 or storage device 908 and classifies each of the received pages 904 as being one of: directional and non-directional. Page Classification Processor 909 further stores the classification 'directional' or 'non-directional' to storage device 908. Page Selector Module 910 functions to select pages from amongst the plurality of pages of scanned documents for further processing. As discussed with respect to steps 608 and 626, all the received pages may be selected or, in the alternative, only a subset of the received pages 904 are selected for further processing. Page Selector Module 910 further determines whether the selected page has been classified as being either 'directional' or 'non-directional'. Page Selector Module 910 further determines whether any more pages remain to be processed. Selected pages which have been classified by Page Classification Processor 909 as being non-directional are provided to Page Queue Buffer 911 for further processing. Non-directional pages provided to Queue 911 are, in various embodiments hereof, re-examined by Page Orientation Direction Detection Module 907 or provided to Alternative Detection Module M2 (at 912) which employs a different page orientation direction detection technique as was employed on a first iteration by Detection Module 907. As discussed, precisely how non-directional pages are processed will depend on the configuration of the document processing environment wherein the present method finds it's implementation and on the goals and objectives of the operator thereof. Page Selector Module 910 is in communication with storage device 908 and each of Modules 907 and 909. Selected pages are provided by Selector Module 910 to Page Clustering Module 913. Page Clustering Module 913 functions to cluster pages classified as 'directional' into groups of pages. As discussed with respect to step 614, clustering is based upon a structural similarity of pages. Pages having a similar structure are clustered into the same group. Such information can be retrieved from storage device 908 or received from workstation 902. Alternatively, a user of a workstation 902 may be queried to enter structural information about received pages 904 and that information relied upon, in whole or in part, by Page Clustering Module 913 to cluster pages into groups based upon structural similarities. Module 913 may further execute various embodiments of the example pseudocode provided herein for clustering. Group Selector Module 914 functions to select groups of pages for processing, in a manner as describe above with respect to steps 618 and 624. Group Selector Module 914 further determines whether any more groups remain to be processed. A user may provide an input, via workstation 902, as to which groups are desired to be processed. Group Orientation Direction Estimation Processor 915 receives the group to be processed from Group Selector Module 914 and estimates a group orientation direction for the selected group of pages. Page Orientation Correction Module 916 functions to determine whether a given page's orientation direction requires correction. If so then Signal Generator 917 signals Orientation Correction Module 918 to correct (or flip) a page's orientation direction. Signals may take the form of instructions sent, via a communications interface, from computer workstation 902 to Module 918.

Figure 10:
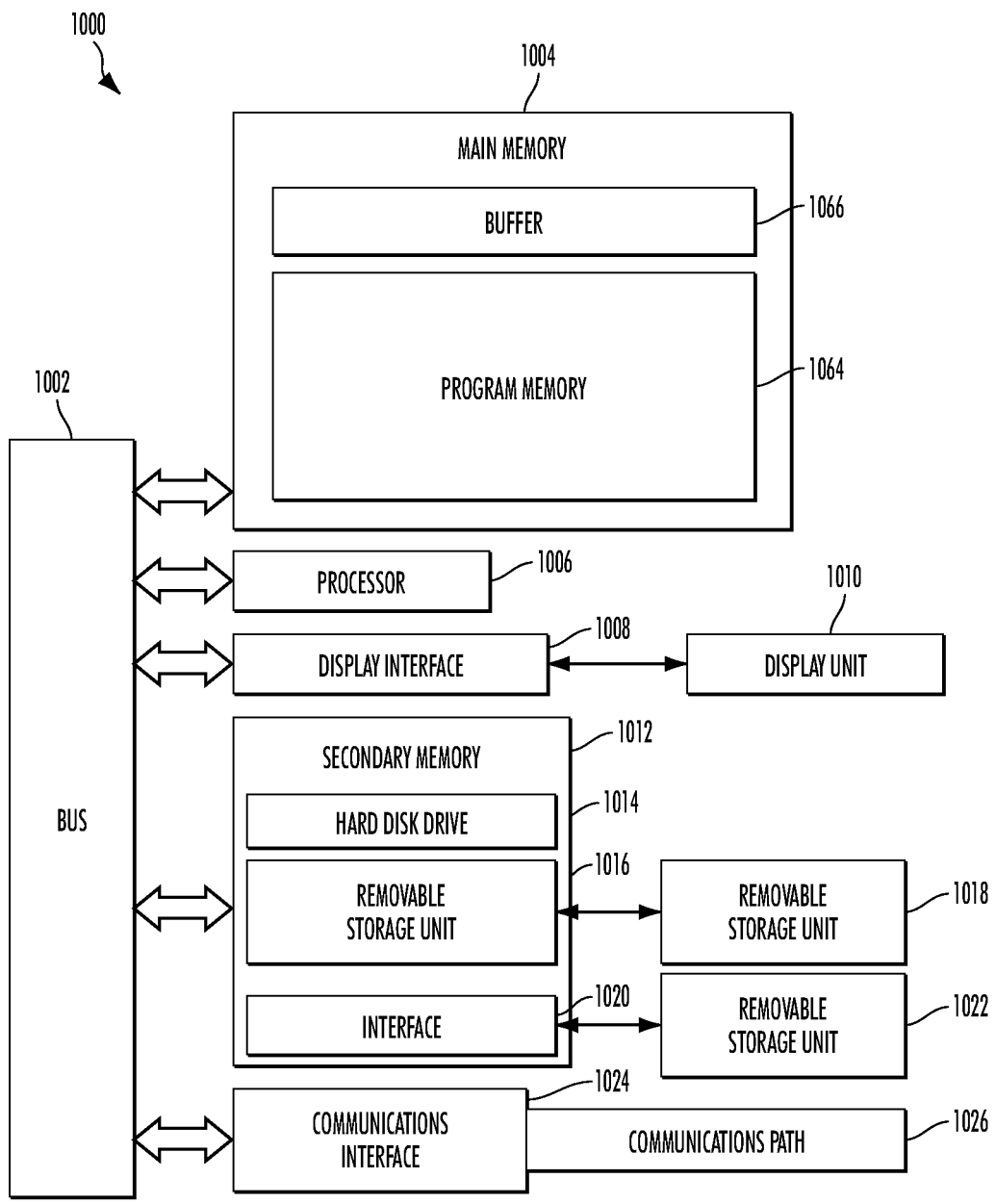
FIG. 10 illustrates a block diagram of one example embodiment of a special purpose computer system for performing one or more aspects of the present system and method as described with respect to the example flow diagrams of FIGS. 6-8, and the functional block diagram of FIG. 9.

It should be understood that any of the modules and processing units of FIG. 9 are in communication with storage device 908 (via pathways shown or not shown) and may store/retrieve data, parameter values, functions, pages, records, data, and machine readable/executable program instructions required to perform their intended functions. Each of these modules and processing units is also in communication with workstation 902 (via pathways not shown) and may further be in communication with one or more remote devices over network 901. It should be appreciated that some or all of the functionality for any of the modules may be performed, in whole or in part, by components internal to workstation 902 or by a special purpose computer system as shown in FIG. 10. It should also be appreciated that various modules may designate one or more components which may, in turn, comprise software and/or hardware designed to perform the intended function. A plurality of modules may collectively perform a single function. Each module may have a specialized processor capable of executing machine readable program instructions. A module may comprise a single piece of hardware such as an ASIC, electronic circuit, or special purpose processor. A plurality of modules may be executed by either a single special purpose computer system or a plurality of special purpose computer systems in parallel. Connections between modules include both physical and logical connections. Modules may further include one or more software/hardware modules which may further comprise an operating system, drivers, device controllers, and other apparatuses some or all of which may be connected via a network. It is also contemplated that one or more aspects of the present method may be implemented on a dedicated computer system and may also be practiced in distributed computing environments where tasks are performed by remote devices that are linked through a network.

Example Special Purpose Computer

Reference is now being made to FIG. 10 which illustrates a block diagram of one example special purpose computer for implementing one or more aspects of the present method as described with respect to the flow diagrams of FIGS. 6, 7 and 8, and the various modules and processing units of the block diagram of FIG. 9. Such a special purpose processor is capable of executing machine executable program instructions and may comprise any of a micro-processor, micro-controller, ASIC, electronic circuit, or any combination thereof. Such a special purpose computer can be integrated, in whole or in part, with a xerographic system or a color management or image processing system placed in the image path of a document reproduction device.

Special purpose computer system 1000 includes processor 1006 for executing machine executable program instructions for carrying out all or some of the present method. The processor is in communication with bus 1002. The system includes main memory 1004 for storing machine readable instructions. Main memory may comprise random access memory (RAM) to support reprogramming and flexible data storage. Buffer 1066 stores data addressable by the processor. Program memory 1064 stores machine readable instructions for performing the present method. A display interface 1008 forwards data from bus 1002 to display 1010. Secondary memory 1012 includes a hard disk 1014 and storage device 1016 capable of reading/writing to removable storage unit 1018, such as a floppy disk, magnetic tape, optical disk, etc. Secondary memory 1012 may further include other mechanisms for allowing programs and/or machine executable instructions to be loaded onto the processor. Such mechanisms may include, for example, a storage unit 1022 adapted to exchange data through interface 1020 which enables the transfer of software and data. The system includes a communications interface 1024 which acts as both an input and an output to allow data to be transferred between the system and external devices such as a color scanner (not shown). Example interfaces include a modem, a network card such as an Ethernet card, a communications port, a PCMCIA slot and card, etc. Software and data transferred via the communications interface are in the form of signals. Such signal may be any of electronic, electromagnetic, optical, or other forms of signals capable of being received by the communications interface. These signals are provided to the communications interface via channel 1026 which carries such signals and may be implemented using wire, cable, fiber optic, phone line, cellular link, RF, memory, or other means known in the arts.

The teachings hereof can be implemented in hardware or software using any known or later developed systems, structures, devices, and/or software by those skilled in the applicable art without undue experimentation from the functional description provided herein with a general knowledge of the relevant arts.

One or more aspects of the methods described herein are intended to be incorporated in an article of manufacture, including one or more computer program products, having computer usable or machine readable media. For purposes hereof, a computer usable or machine readable media is, for example, a floppy disk, a hard-drive, memory, CD-ROM, DVD, tape, cassette, or other digital or analog media, or the like, which is capable of having embodied thereon a computer readable program, one or more logical instructions, or other machine executable codes or commands that implement and facilitate the function, capability, and methodologies described herein. Furthermore, the article of manufacture may be included on at least one storage device readable by a machine architecture or other xerographic or image processing system embodying executable program instructions capable of performing the methodology described in the flow diagrams. Additionally, the article of manufacture may be included as part of a xerographic system, an operating system, a plug-in, or may be shipped, sold, leased, or otherwise provided separately, either alone or as part of an add-on, update, upgrade, or product suite.

It will be appreciated that various of the above-disclosed and other features and functions, or alternatives thereof, may be desirably combined into many other different systems or applications. Various presently unforeseen or unanticipated alternatives, modifications, variations, or improvements therein may become apparent and/or subsequently made by those skilled in the art, which are also intended to be encompassed by the following claims. Accordingly, the embodiments set forth above are considered to be illustrative and not limiting. Various changes to the above-described embodiments may be made without departing from the spirit and scope of the invention. The teachings of any printed publications including patents and patent applications, are each separately hereby incorporated by reference in their entirety.

What is claimed is:

1. A method for correcting the orientation direction detected for pages of scanned documents, the method comprising:
   receiving a plurality of pages of at least one digital document;
   for each page of said plurality of pages:
      determining an initial orientation direction for this page using a first direction detection algorithm, said initial orientation direction being one of: a forward and an inverted direction;
      determining a confidence level associated with this page's initial orientation direction, based upon a pre-determined threshold;
      in response to said confidence level being below said pre-determined threshold, re-determining said initial orientation direction for said page using a second detection algorithm, said first detection algorithm and said second detection algorithm being different;
      determining a structural similarity between this page's forward and inverted versions
      classifying, based upon said structural similarity, said page as being one of: directional and non-directional;
   clustering pages classified as being directional into groups of pages based upon a similarity in page structure;
   for each group of pages:
      estimating a group orientation direction based upon a total amount of pages having a same initial orientation direction; and
      for each page within each group:
         determining, based upon this page's confidence level, whether this page's orientation direction requires correction; and
         in response to said page's orientation direction requiring correction, signaling a document processing system to change this page's initial orientation direction.

2. The method of claim 1, wherein determining said initial orientation direction comprises any of: up/down asymmetry of text, optical character recognition, and selective character recognition.

3. The method of claim 1, wherein classifying each of said pages as being one of: directional and non-directional comprises any of:
   analyzing said given page for content;
   comparing bitmaps between said given page's forward and inverted versions;

retrieving information about said given page from a storage device;

receiving information about said pages from a document analysis system; and in response to a user input.

4. The method of claim 1, wherein said first direction detection algorithm and said second detection algorithm comprise an up/down asymmetry of text and optical character recognition.

5. The method of claim 1, wherein said first direction detection algorithm and said second detection algorithm comprise an up/down asymmetry of text and selective character recognition.

6. The method of claim 1, wherein said first direction detection algorithm and said second detection algorithm comprise an up/down asymmetry of text and a user input.

7. The method of claim 1, wherein said first direction detection algorithm and said second detection algorithm comprise a selective character recognition and a user input.

8. The method of claim 1, wherein classifying each of said pages as being one of: directional and non-directional comprises a correlation operation at resolutions between 0.5 and 2.0 dots per inch.

9. A system for correcting the orientation direction detected for pages of scanned documents, the system comprising:

a document scanning device;

a document processing system capable of changing a given page's detected orientation direction;

a memory and a storage medium; and a processor in communication with said document scanning device and said memory and storage medium, said processor executing machine readable instructions for performing the method of:

receiving a plurality of pages of at least one digital document;

for each page of said plurality of pages:

determining an initial orientation direction for this page using a first direction detection algorithm, said initial orientation direction being one of: a forward and an inverted direction;

determining a confidence level associated with this page's initial orientation direction, based upon a pre-determined threshold;

in response to said confidence level being below said pre-determined threshold, re-determining said initial orientation direction for said page using a second detection algorithm, said first detection algorithm and said second detection algorithm being different;

determining a structural similarity between this page's forward and inverted versions classifying, based upon said structural similarity, said page as being one of: directional and non-directional;

clustering pages classified as being directional into groups of pages based upon a similarity in page structure;

for each group of pages:

estimating a group orientation direction based upon a total amount of pages having a same initial orientation direction; and for each page within each group:

determining, based upon this page's confidence level, whether this page's orientation direction requires correction; and in response to said page's orientation direction requiring correction, signaling a document processing system to change this page's initial orientation direction.

10. The system of claim 9, wherein determining said initial orientation direction comprises any of: up/down asymmetry of text, optical character recognition, and selective character recognition.

11. The system of claim 9, wherein said determination of structural similarity between a given page's forward and inverted versions comprises any of:

analyzing said given page for content;

comparing bitmaps between said given page's forward and inverted versions;

retrieving information about said given page from a storage device;

receiving information about said pages from a document analysis system; and in response to a user input.

12. The system of claim 9, wherein said first direction detection algorithm and said second detection algorithm comprise an up/down asymmetry of text and optical character recognition.

13. The system of claim 9, wherein said first direction detection algorithm and said second detection algorithm comprise an up/down asymmetry of text and selective character recognition.

14. The system of claim 9, wherein said first direction detection algorithm and said second detection algorithm comprise an up/down asymmetry of text and a user input.

15. The system of claim 9, wherein said first direction detection algorithm and said second detection algorithm comprise an selective character recognition and a user input.

16. The system of claim 9, wherein classifying each of said pages as being one of: directional and non-directional comprises a correlation operation at resolutions between 0.5 and 2.0 dots per inch.

* * * * *